(12) United States Patent
Sasaki et al.

(10) Patent No.: US 8,821,593 B2
(45) Date of Patent: Sep. 2, 2014

(54) METHOD FOR MANUFACTURING ELECTRODE FOR ELECTROCHEMICAL ELEMENT

(75) Inventors: Tomokazu Sasaki, Kanagawa (JP); Yujiro Toyoda, Tokyo (JP)

(73) Assignee: Zeon Corporation, Tokyo (JP)

( * ) Notice: Subject to any disclaimer, the term of this patent is extended or adjusted under 35 U.S.C. 154(b) by 380 days.

(21) Appl. No.: 13/121,389

(22) PCT Filed: Sep. 28, 2009

(86) PCT No.: PCT/JP2009/066764
§ 371 (c)(1),
(2), (4) Date: Mar. 28, 2011

(87) PCT Pub. No.: WO2010/035827
PCT Pub. Date: Apr. 1, 2010

(65) Prior Publication Data
US 2011/0176255 A1    Jul. 21, 2011

(30) Foreign Application Priority Data

Sep. 29, 2008 (JP) ................. 2008-249912
Sep. 30, 2008 (JP) ................. 2008-254576
Sep. 30, 2008 (JP) ................. 2008-254582

(51) Int. Cl.
| | | |
|---|---|---|
| H01G 9/00 | (2006.01) | |
| H01M 4/04 | (2006.01) | |
| H01G 11/70 | (2013.01) | |
| H01G 9/04 | (2006.01) | |
| H01M 4/74 | (2006.01) | |
| H01G 11/86 | (2013.01) | |
| H01G 9/008 | (2006.01) | |
| H01G 11/28 | (2013.01) | |
| H01M 12/00 | (2006.01) | |
| H01G 11/04 | (2013.01) | |

(52) U.S. Cl.
CPC ............. *H01M 4/0402* (2013.01); *H01G 11/70* (2013.01); *H01G 9/058* (2013.01); *Y02T 10/7022* (2013.01); *Y02E 60/13* (2013.01); *H01M 4/745* (2013.01); *H01G 11/86* (2013.01); *H01M 4/742* (2013.01); *H01G 9/016* (2013.01); *Y02E 60/128* (2013.01); *H01G 11/28* (2013.01); *H01M 12/005* (2013.01); *H01G 11/04* (2013.01)
USPC ........................................................ 29/25.03

(58) Field of Classification Search
None
See application file for complete search history.

(56) References Cited

U.S. PATENT DOCUMENTS

| | | |
|---|---|---|
| 2004/0264110 A1 | 12/2004 | Michel et al. |
| 2006/0035072 A1 | 2/2006 | Abe et al. |
| 2006/0063071 A1 | 3/2006 | Yasuda et al. |

FOREIGN PATENT DOCUMENTS

| | | |
|---|---|---|
| JP | 2005-516412 A | 6/2005 |
| JP | 2006-77233 A | 3/2006 |

(Continued)

OTHER PUBLICATIONS

International Search Report, dated Dec. 22, 2009, issued in PCT/JP2009/066764.

(Continued)

*Primary Examiner* — Seahvosh Nikmanesh
(74) *Attorney, Agent, or Firm* — Birch, Stewart, Kolasch & Birch, LLP (57) ABSTRACT

Disclosed is a method for manufacturing an electrode for an electrochemical element, that is capable of forming an electrode active material layer on a current collector, particularly a perforated current collector having through-holes extended from the obverse surface to the reverse surface thereof, such as a punching metal or an expanded metal, simply, evenly and with good adhesion. The method is characterized by comprising the steps of (1) forming an electrode active material layer on a surface of a base material by using an electrode composition containing an electrode active material, an electroconductive material, and a binder, (2) laminating a current collector on the electrode active material layer formed on the surface of the base material, followed by hot pressing to bond the electrode active material layer and the current collector to each other, and (3) separating the base material from the electrode active material layer.

10 Claims, 1 Drawing Sheet

(56) References Cited

FOREIGN PATENT DOCUMENTS

| | | |
|---|---|---|
| JP | 2006-155900 A | 6/2006 |
| JP | 2007-5747 A | 1/2007 |
| JP | 2008-41971 A | 2/2008 |

OTHER PUBLICATIONS

English translation of the International Preliminary Report on Patentability and Written Opinion of the International Searching Authority dated May 19, 2011 for Application No. PCT/JP2009/066764.

METHOD FOR MANUFACTURING ELECTRODE FOR ELECTROCHEMICAL ELEMENT

TECHNICAL FIELD

The present invention relates to a method for manufacturing an electrode used for an electrochemical element such as lithium-ion secondary battery and electric double layer capacitor (hereinafter may collectively be referred to as an "electrode for an electrochemical element"); and further specifically relates to a method capable of easily forming an electrode active material layer on a collector, particularly on a perforated collector.

BACKGROUND ART

The demand for an electrochemical element, such as a lithium-ion secondary battery, an electric double layer capacitor and a hybrid capacitor including a lithium-ion capacitor, has rapidly been expanded because of its characteristics such as small size, lightweight and high energy density as well as capability of repeated charge-discharge. The lithium-ion secondary battery is used in the fields of mobile phones, laptop PC and the like, because of its relatively large energy density. Also, the electric double layer capacitor is used as a small-sized electric source for memory backup for PC and the like, because of its capability of rapid charge-discharge. Furthermore, the electric double layer capacitor can be expected for the application as a large-size electric source for an electric vehicle. Also, the hybrid capacitor, which combines both advantages of the lithium-ion secondary battery and the electric double layer capacitor, has drawn attention due to its high energy density and power density. Further improvements such as lowered resistance, increased capacity and improved mechanical properties are required in these electrochemical elements as the applications are expanded and developed.

The hybrid capacitor has a polarizable electrode for its positive electrode and a non-polarizable electrode for its negative electrode, and uses an organic electrolyte, which allows increasing both operating voltage and energy density. For the hybrid capacitor, it is proposed to use a material, obtained by preliminarily storing lithium-ion in a material able to store and release lithium-ion by a chemical method or electrochemical method, for the negative electrode (e.g. Patent Documents 1 and 2).

As a method for making the negative electrode preliminarily carry lithium in the case of a large-scale cell such as an electric source for automobile, it is proposed that lithium derived from the negative electrode is carried by electrochemical contact with lithium source arranged to face the negative electrode or the positive electrode in an organic electrolytic battery where each of a positive electrode collector and a negative electrode collector has pores penetrating front and back surfaces thereof, and a negative electrode active material is capable of reversibly carrying lithium (e.g. Patent Document 3). In Patent Document 3, the collector is provided with pore penetrating front and back surfaces, and electrode active material layers are formed on both sides of the perforated collector (hereinafter the collector having penetrating pore may be referred to as "perforated collector"). Due to such a constitution, the capacitance can be improved and also, lithium-ion enables to move between both sides of the electrode without being blocked by the collector, so that not only the negative electrode arranged near the lithium source but also the negative electrode arranged away from the lithium source can electrochemically carry lithium ion via through pores even in an electric storage device having a cell constitution with a large number of stacked layers. Also, discharge and charge proceeds smoothly because lithium-ion freely moves between respective electrodes via the through pores.

The electrode active material layer can be formed by coating slurry of electrode composition including an electrode active material, conducting material and binder on a collector followed by drying. Particularly, there is proposed a twin-blade method, wherein a pair of dies are arranged on both sides of a path of the collector running in vertical direction for the purpose of simultaneously forming electrode active material layers on the both sides of the collector, and a pair of blades are provided above the pair of dies to control a coating thickness by scraping the slurry ejected from the dies with the blades. However, for the perforated collector having through pores, it is difficult to coat the slurry with uniform thickness, so that the thickness of the electrode active material layer and the active material amount in the obtained electrode may vary to cause variation in electrode performance. Also, since the slurry is coated on both sides of the collector in this method, two dies are always required and furthermore, two sets of tanks for coating material, supply pump, filter, pipe and the like are respectively needed, resulting in complexed equipment and increased cost. Also, it is necessary to strictly adjust clearance of the two dies, ejecting amount of the slurry, clearance of die lip portion, etc. for controlling the coating thickness and surface condition of the electrode. Furthermore, the slurry may be transferred on a rotating roller when the perforated collector such as punching metal and expanded metal is fed to a common horizontal coating machine such as Comma Coater, so that it is difficult to coat the slurry uniformly on the collector.

As a method for forming the electrode active material layer on the perforated collector with an uniform thickness, for example, Patent Document 4 discloses a method wherein electrode material is formed into a sheet and agglutinated to the collector at one time by providing electrode material to a pair of press rolls by using a metering feeder and also providing the collector between the press rolls.

Also, Patent Document 5 proposes a method for forming the electrode active material layer on the collector by contacting slurry coated on a base material with a perforated collector for unification, followed by drying the slurry and peeling the base material. In this method, the slurry layer where the base material is layered is dried, so that it is hard to uniformly evaporate the solvent of the slurry. Therefore, in Patent Document 5, a porous base material is used for the base material for uniformly evaporating the solvent and obtaining a uniform thickness of the dried electrode active material.

[Patent Document 1] The Japanese Unexamined Patent Publication H03-233860,
[Patent Document 2] The Japanese Unexamined Patent Publication H05-325965,
[Patent Document 3] International Publication No. 98/33227 (which corresponds to U.S. Pat. No. 6,461,769),
[Patent Document 4] The Japanese Unexamined Patent Publication 2007-5747
[Patent Document 5] The Japanese Unexamined Patent Publication 2008-41971

DISCLOSURE OF INVENTION

Problem to be Solved by the Invention

However, in the method disclosed in Patent Document 4, the electrode material may be left and attached onto the press roll when the electrode material is transferred from the press roll to the collector. As a result, the amount of the electrode material transferred to the collector may not be constant, and also, the thickness of the electrode active material layer may not be uniform, so that the electrode properties may vary.

In the method of Patent Document 5, the electrode material may be left and attached onto the porous base material when the porous base material is peeled from the electrode active material layer after drying the slurry, causing similar problems. Also, there are other problems such that slurry viscosity and pore size of the porous base material are limited for coating and drying of the slurry.

Therefore, the purpose of the present invention is to provide a method for manufacturing an electrode for an electrochemical element, able to easily, uniformly and highly-adhesively form an electrode active material layer on a collector, particularly on a perforated collector having through pores penetrating front and back surfaces such as punching metal and expanded metal.

Means for Solving the Problem

The present inventors found, as a result of keen examination for solving the above problems, that by forming an electrode active material layer on the surface of a base material and transferring it to a collector by hot press, an electrode for an electrochemical element can highly-adhesively be produced, with good productivity and uniform quality, to a perforated collector hard to be coated thereon, such as punching metal and expanded metal.

Namely, the present invention to solve the above problems includes the following features as its gist.

[1] A method for manufacturing an electrode for an electrochemical element comprising: (1) forming an electrode active material layer on a surface of a base material by using an electrode composition including an electrode active material, conducting material and binder;
(2) laminating the electrode active material layer, formed on the surface of the base material, and a collector, followed by bonding the same by hot press; and
(3) separating the base material from the electrode active material layer.

[2] The method for manufacturing as set forth in the above [1], wherein the surface of the base material is preliminarily subjected to release treatment in the above step (1).

[3] The method for manufacturing as set forth in the above [2], wherein the above release treatment is done by treating one surface or both surfaces of a thermoplastic resin film with thermosetting resin.

[4] The method for manufacturing as set forth in the above [2] or [3], wherein a contact angle with water in the surface with release treatment of the base material is 80 to 110°.

[5] The method for manufacturing as set forth in any one of the above [2] to [4], wherein the above step (1) comprises coating aqueous slurry including the electrode composition and water on the surface of the base material with release treatment.

[6] The method for manufacturing as set forth in any one of the above [1] to [5], wherein the above step (1) comprises drying after coating slurry of electrode composition including electrode active material, conducting material and binder on the above surface of the base material.

[7] The method for manufacturing as set forth in any one of the above [1] to [6], wherein the collector is a perforated collector.

[8] The method for manufacturing as set forth in any one of the above [1] to [7], wherein the binder includes an acrylate-based polymer.

[9] The method for manufacturing as set forth in any one of the above [1] to [8], wherein the electrode composition further includes a surfactant.

[10] The method for manufacturing as set forth in any one of the above [1] to [9], wherein the electrode composition further includes organic solvent having boiling point of 50 to 150° C.

[11] The method for manufacturing as set forth in the above [9], wherein the surfactant is an anionic surfactant.

[12] The method for manufacturing as set forth in the above [10], wherein the organic solvent is alcohols.

[13] An electrochemical element provided with an electrode for an electrochemical element obtained by any one of the methods for manufacturing as set forth in the above [1] to [12].

[14] The electrochemical element as set forth in the above [13], wherein the electrochemical element is a hybrid capacitor.

Effects of the Invention

According to the present invention, it is possible to highly-adhesively and easily form an electrode active material layer having uniform thickness on a collector, particularly on a perforated collector such as punching metal and expanded metal. Furthermore, an electrode for an electrochemical element can be produced with good productivity by means of common equipments. Also, the electrode active material layer can be simultaneously bonded to both surfaces of the collector because the electrode active material layer is formed on a base material, so that the productivity in the electrode production can be increased.

MODES FOR WORKING THE INVENTION

Figure 1:
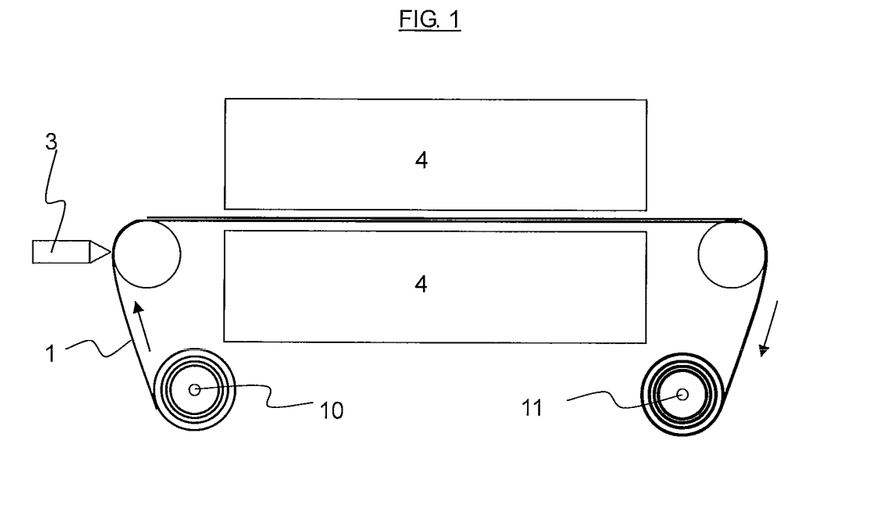
FIG. 1 is a schematic view showing one step of the method for manufacturing according to the present invention.
Figure 2:
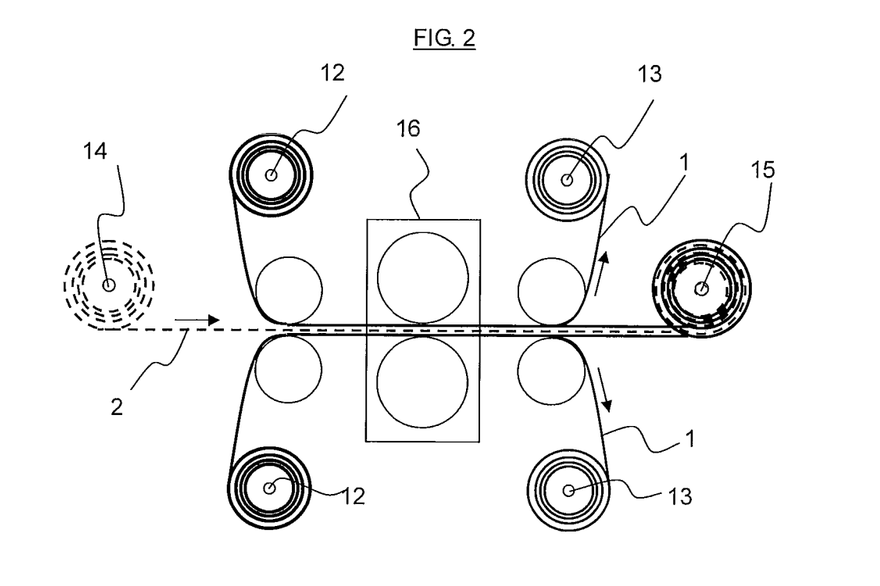
FIG. 2 is a schematic view showing one step of the method for manufacturing according to the present invention.

Hereinafter, the method for manufacturing an electrode for an electrochemical element according to the present invention will further specifically be explained in reference to the drawings. FIG. 1 and FIG. 2 show outlined flows of the method for manufacturing of the present invention.

The method for manufacturing an electrode for an electrochemical element according to the present invention comprises forming an electrode active material layer on the surface of base material 1 by using an electrode composition including an electrode active material, conducting material and binder (FIG. 1); laminating the electrode active material layer, formed on the surface of the base material, and a collector followed by bonding the same by hot press; and separating the base material from the electrode active material layer (FIG. 2).

Hereinafter, the base material, electrode active material, conducting material, binder, collector and the like used in the present invention will be explained.

<Base Material>

For the base material used in the present invention, any inorganic material and organic material can be used without limitation as far as the electrode active material layer can be coated thereon. For example, there may be mentioned aluminum foil, copper foil, ionomer film (IO film), polyethylene film (PE film), polyethylene terephthalate film (PET film), polyethylene naphthalate film (PEN film), polyvinyl chloride film (PVC film), polyvinylidene chloride film (PVDC film), polyvinyl alcohol film (PVA film), polypropylene film (PP film), polyester film, polycarbonate film (PC film), polystyrene film (PS film), polyacrylonitrile film (PAN film), ethylene-vinyl acetate copolymer film (EVA film), ethylene-vinyl alcohol copolymer film (EVOH film), ethylene-methacrylic acid copolymer film (EMAA film), nylon film (NY film, polyamide (PA) film), cellophane, imide film, paper, etc. Also, a multilayer film obtained by laminating the above films may be used. Among these, the thermoplastic resin film is preferable in view of general versatility and handling, and particularly PET film, PE film, PP film, PVC film and the like are preferred.

The thickness of the base material is not particularly limited, and is preferably 5 μm to 200 μm, further preferably 30 μm to 150 μm. Also, the width is not particularly limited, and is preferably about 100 mm to 1000 mm, further preferably about 200 mm to 500 mm.

It is preferable that the surface of the base material on which the electrode active material layer is formed is preliminarily subjected to release treatment. The release treatment may be done either on only one surface of the base material, or on both surfaces. The method for release treatment is not particularly limited, and it is preferable to use, for example, a method including a step of coating thermosetting resin such as alkyd resin on a base material followed by setting; a method including a step of coating silicone resin on a base material followed by setting; and a method including a step of coating fluorine containing resin on a base material. Particularly, the release treatment using thermosetting resin able to easily form a uniform release treatment layer is preferable, and the release treatment including coating of alkyd resin followed by setting is also preferable in view of the balance between coating property of the after-mentioned aqueous slurry and release property of the obtained electrode active material layer.

When the electrode active material layer is formed by coating aqueous slurry, contact angle with water in the surface with release treatment of the base material is preferably in the range of 80 to 110°, further preferably in the range of 90 to 100°. When the contact angle with water in the surface with release treatment is too small, the coating property of the slurry is fine while it may be difficult to peel off the electrode active material layer formed after drying the slurry from the base material. On the other hand, when the contact angle is too large, the electrode active material layer can easily be peeled off from the base material while it may be difficult to attain uniform coating because the slurry is repelled on the surface of the base material. Thus the coating property is hardly compatible with release property in general, but by setting the contact angle with water in the surface with release treatment of the base material within the above range, the coating property of the aqueous slurry and release property of the electrode active material layer can be balanced to form an electrode active material layer with uniform thickness, and also to easily peel off the electrode active material layer.

The base material can be repeatedly used, and thus-repeated use allows further reduction of production cost of the electrode.

<Electrode Composition>

The electrode active material layer is formed by the electrode composition including an electrode active material, conducting material and binder.

(Electrode Active Material)

The electrode active material used in the present invention is a material for delivery and receipt of an electron in the electrode for an electrochemical element. The electrode active material mainly includes an active material for a lithium-ion secondary battery, an active material for an electric double layer capacitor and an active material for a lithium-ion capacitor.

The active material for a lithium-ion secondary battery includes those for a positive electrode and those for a negative electrode. As the electrode active material used for a positive electrode of a lithium-ion secondary battery, there may be specifically illustrated lithium containing complex metal oxide such as $LiCoO_2$, $LiNiO_2$, $LiMnO_2$, $LiMn_2O_4$, $LiFePO_4$ and $LiFeVO_4$; transition metal sulfide such as $TiS_2$, $TiS_3$ and amorphous $MoS_3$; transition metal oxide such as $Cu_2V_2O_3$, amorphous $V_2O.P_2O_5$, $MoO_3$, $V_2O_5$ and $V_6O_{13}$. Furthermore, conducting polymer such as polyacetylene and poly-p-phenylene may be mentioned. The lithium containing complex metal oxide is preferable.

As the electrode active material used for a negative electrode of a lithium-ion secondary battery, there may be specifically mentioned carbonaceous material such as amorphous carbon, graphite, natural graphite, mesocarbon microbead (MCMB) and pitch-based carbon fiber; conducting polymer such as polyacene; etc. Crystalline carbonaceous material such as graphite, natural graphite and mesocarbon microbead (MCMB) is preferable.

The shape of the electrode active material used for an electrode for a lithium-ion secondary battery is preferably granulated. When the particle shape is spherical, it is possible to form a further high-density electrode at the forming of the electrode.

The volume average particle size of the electrode active material used for an electrode for a lithium-ion secondary battery is normally 0.1 to 100 μm, preferably 1 to 50 μm and more preferably 5 to 20 μm, for both positive electrode and negative electrode.

The tap density of the electrode active material used for an electrode for a lithium-ion secondary battery is not particularly limited, and it is preferable to use those with tap density of 2 $g/cm^3$ or more for positive electrode, and those with tap density of 0.6 $g/cm^3$ or more for negative electrode.

As the electrode active material used for an electrode for an electric double layer capacitor, carbon allotrope is normally used. Specific examples of the carbon allotrope may include activated carbon, polyacene, carbon whisker and graphite, etc., and powder or fiber thereof can be used. The preferable electrode active material is activated carbon, and specifically, there may be mentioned activated carbon made of phenolic resin, rayon, acrylonitrile resin, pitch and palm husk, etc.

The volume average particle size of the electrode active material used for an electrode for an electric double layer capacitor is normally 0.1 to 100 μm, preferably 1 to 50 μm, further preferably 5 to 20 μm.

The specific surface area of the electrode active material used for an electrode for an electric double layer capacitor is 30 $m^2/g$ or more, preferably 500 to 5,000 $m^2/g$, more preferably 1,000 to 3,000 $m^2/g$. When the specific surface area of the electrode active material is larger, the density of the obtained electrode active material layer tends to decrease, so that an electrode active material layer having desired density can be obtained by properly selecting the electrode active material.

The electrode active material used for an electrode for a lithium-ion capacitor includes those for a positive electrode and those for a negative electrode. The electrode active material used for a positive electrode for a lithium-ion capacitor may be any of those able to reversibly carry a lithium-ion and anion such as tetrafluoroborate. Specifically, carbon allotrope can normally be used, and the electrode active material used for an electric double layer capacitor can be widely used. When using carbon allotropes in combination, two or more kinds of carbon allotropes having different average particle size or particle size distribution may be used in combination. Also, polyacene-based organic semiconductor (PAS) having a polyacene-based backbone structure whose atom ratio of hydrogen atom/carbon atom is 0.50 to 0.05, which is a heat-treated aromatic condensation polymer, can also preferably be used. The electrode active material used for an electrode for an electric double layer capacitor is preferable.

The electrode active material used for a negative electrode for a lithium-ion capacitor is a material able to reversibly carry a lithium-ion. Specifically, the electrode active material used for a negative electrode for a lithium-ion secondary battery can widely be used. Preferably, there may be mentioned crystalline carbon materials such as black lead and hardly-graphitized carbon, the polyacene-based organic semiconductor (PAS) mentioned as the above positive electrode active material. The carbon materials and PAS can be obtained by carbonizing phenolic resin and the like, and if necessary activating, followed by pulverization.

The shape of the electrode active material used for an electrode for a lithium-ion capacitor is preferably granulated. When the particle shape is spherical, it is possible to form a further high-density electrode at the forming of the electrode.

The volume average particle size of the electrode active material used for an electrode for a lithium-ion capacitor is normally 0.1 to 100 μm, preferably 1 to 50 μm and more preferably 5 to 20 μm, for both positive electrode and negative electrode. The electrode active material can be used alone or in combination of two or more.

(Conducting Material)

The conducting material used in the present invention comprises particulate carbon allotrope having conductive property and not having fine pore able to form an electric double layer, and specifically, there may be mentioned conductive carbon black such as furnace black, acetylene black and Ketjen black (registered trademark of Akzo Nobel Chemicals Besloten Vennootschap). Among these, acetylene black and furnace black are preferable.

The volume average particle size of the conducting material used in the present invention is preferably smaller than the volume average particle size of the electrode active material, and its range is normally 0.001 to 10 μm, preferably 0.05 to 5 μm, more preferably 0.01 to 1 μm. When the volume average particle size of the conducting material is within the range, higher conductive property can be obtained with smaller used amount. The conducting material can be used alone or in combination of two or more. The amount of the conducting material is normally in the range of 0.1 to 50 parts by weight, preferably 0.5 to 15 parts by weight and more preferably 1 to 10 parts by weight, to 100 parts by weight of the electrode active material. When the amount of the conducting material is within the above range, it is possible to obtain high capacity and low internal resistance for a battery using the obtained electrode.

(Binder)

The binder used in the present invention is not particularly limited as far as it is a compound able to mutually bind the electrode active material and conducting material. Preferred binder is distributed binder having dispersibility into a solvent. As the distributed binder, for example, there may be mentioned high-molecular compound such as fluoropolymer, diene polymer, acrylate polymer, polyimide, polyamide and polyurethane. Among these, fluoropolymer, diene polymer or acrylate polymer is preferable, and diene polymer or acrylate polymer is more preferable in view of increased withstand voltage and increased energy density of the electrochemical element.

The diene polymer is a copolymer obtained by polymerizing homopolymer of conjugated diene or monomer mixture containing conjugated diene, or hydrogenated product thereof. The ratio of the conjugated diene in the above monomer mixture is normally 40 wt % or more, preferably 50 wt % or more, more preferably 60 wt % or more. Specific examples of the diene polymer may include conjugated diene homopolymer such as polybutadiene and polyisoprene; aromatic vinyl-conjugated diene copolymer such as styrene-butadiene copolymer (SBR) which may be carboxy-modified; vinyl cyanide-conjugated diene copolymer such as acrylonitrile-butadiene copolymer (NBR); hydrogenated SBR, hydrogenated NBR, etc.

The acrylate polymer is a copolymer obtained by polymerizing polymer containing a monomer unit derived from a compound expressed in a general formula (1): $CH_2=CR^1-COOR^2$ (where $R^1$ is hydrogen atom or methyl group and $R^2$ is alkyl group or cycloalkyl group), specifically homopolymer of the compound expressed in the general formula (1), or polymerizing monomer mixture containing the compound expressed in the above general formula (1). As a specific example of the compound expressed in the general formula (1), there may be mentioned acrylate such as ethyl acrylate, propyl acrylate, isopropyl acrylate, n-butyl acrylate, isobutyl acrylate, t-butyl acrylate, n-amyl acrylate, isoamyl acrylate, n-hexyl acrylate, 2-ethylhexyl acrylate, lauryl acrylate and stearyl acrylate; methacrylate such as ethyl methacrylate, propyl methacrylate, isopropyl methacrylate, n-butyl methacrylate, isobutyl methacrylate, t-butyl methacrylate, n-amyl methacrylate, isoamyl methacrylate, n-hexyl methacrylate, 2-ethylhexyl methacrylate, lauryl methacrylate and stearyl methacrylate, etc. Among these, acrylate is preferable, and n-butyl acrylate and 2-ethylhexyl acrylate are particularly preferable because the strength of the obtained electrode can be improved. The ratio of the monomer unit derived from the compound expressed in the above general formula (1) in the acrylate polymer is normally 50 wt % or more, preferably 70 wt % or more. When using the acrylate polymer having the ratio of the monomer unit derived from the compound expressed in the above general formula (1) of within the above range, high heat resistance can be obtained, and internal resistance of the obtained electrode for an electrochemical element can be reduced.

For the above acrylate polymer, a copolymerizable carboxylic group-containing monomer can be used other than the compound expressed in the general formula (1). Specific examples of the carboxylic group-containing monomer may include monomer containing monobasic acid such as acrylic acid and methacrylic acid; monomer containing dibasic acid such as maleic acid, fumaric acid and itaconic acid, etc. Among these, the monomer containing dibasic acid is preferable, and itaconic acid is particularly preferable in view of increased binding property with the collector and improved electrode strength. The monomer containing monobasic acid and monomer containing dibasic acid can be used alone or in combination of two or more. The amount of the carboxylic group-containing monomer in monomer mixture at copolymerization is normally in the range of 0.1 to 50 parts by weight, preferably in the range of 0.5 to 20 parts by weight and more preferably in the range of 1 to 10 parts by weight, to 100 parts by weight of the compound expressed in the general formula (1). When the amount of the carboxylic group-containing monomer is within the range, the binding property with the collector can be excellent, and the strength of the obtained electrode can be improved.

For the above acrylate polymer, a copolymerizable nitrile group containing monomer can be used other than the compound expressed in the general formula (1). Specific examples of the nitrile group containing monomer may include acrylonitrile and methacrylonitrile, etc., and among these, acrylonitrile is preferable because of increased binding property with the collector and improved electrode strength. The amount of the acrylonitrile in monomer mixture at copolymerization is normally in the range of 0.1 to 40 parts by weight, preferably in the range of 0.5 to 30 parts by weight and more preferably in the range of 1 to 20 parts by weight, to 100 parts by weight of the compound expressed in the general formula (1). When the amount of the acrylonitrile is within the range, the binding property with the collector can be excellent, and the strength of the obtained electrode can be improved.

The shape of the binder is not particularly limited, and particulate is preferable because of good binding property with the collector, lowered capacity of the produced electrode, and reduced deterioration due to repeated discharge and charge. As particulate binder, for example, there may be mentioned those in which particles of the binder such as latex are dispersed in water and powder binder obtained by drying such a dispersion liquid.

The glass-transition temperature (Tg) of the binder is preferably 50° C. or less, further preferably −40 to 0° C. When the glass-transition temperature (Tg) of the binder is within the range, the binding property can be excellent with smaller used amount, the electrode strength can be strong, flexibility can be increased, and electrode density can easily be increased through pressing step at forming of the electrode.

The number average particle size of the binder is not particularly limited, and is normally 0.0001 to 100 μm, preferably 0.001 to 10 μm, more preferably 0.01 to 1 μm. When the number average particle size of the binder is within the range, excellent binding property can be obtained for the electrode active material layer even with small used amount. Note that the number average particle size can be calculated as an arithmetic mean value of the measured sizes of 100 binder particles randomly-selected in a transmission electron microscopic picture. The particle shape may be either spherical or other shapes. The binder can be used alone or in combination of two or more. The amount of the binder is normally in the range of 0.1 to 50 parts by weight, preferably in the range of 0.5 to 20 parts by weight and more preferably in the range of 1 to 10 parts by weight, to 100 parts by weight of the electrode active material. When the amount of the binder is within the range, adhesion between the obtained electrode active material layer and collector can be sufficiently secured, and high capacity of the electrochemical element and lowered internal resistance can be attained.

Furthermore, the electrode composition preferably includes a surfactant and/or organic solvent having boiling point of 50 to 150° C. Either of the surfactant or organic solvent, or both of these may be included.

(Surfactant)

The surfactant allows well dispersing the electrode active material, conducting material and binder, lowering surface tension of the slurry, and improving coating property. As the surfactant, specifically, there may be mentioned anionic surfactant such as ester salt of alkyl sulfate, alkyl benzene sulfonate, fatty acid salt and naphthalenesulfonate formaldehyde condensation; nonionic surfactant such as polyoxyethylene alkyl ether and glycerin fatty acid ester; cationic surfactant such as alkylamine salt and quaternary ammonium salt; ampholytic surfactant such as alkylamine oxide and alkylbetaine; etc. Anionic surfactant and nonionic surfactant are preferable, and anionic surfactant is particularly preferable because of excellent durability of the electrochemical element.

In case of using the surfactant, the amount thereof is in the range of 0.5 to 20 parts by weight, preferably 1.0 to 10 parts by weight and particularly preferably 2.0 to 5 parts by weight, to 100 parts by weight of the electrode active material. When the amount of the surfactant is within the range, the durability of the electrochemical element can be excellent.

(Organic Solvent)

The use of the organic solvent in the present invention results in improving the coating property of the slurry. Also, by using the organic solvent having boiling point (at normal pressures) of 50 to 150° C., drying process can be simplified because the organic solvent is volatilized at the same time of volatilization of water when drying the electrode composition layer formed by coating aqueous slurry. Also, without leaving the organic solvent in the electrode active material layer after drying, the durability of the electrode can be improved. As the organic solvent, specifically, there may be mentioned alcohols such as methanol, ethanol and isopropanol; alkyl esters such as methyl acetate and ethyl acetate; ketones such as acetone and methyl ethyl ketone; etc. Alcohols and alkyl esters are preferable, and alcohols are particularly preferable because of excellent durability of the electrochemical element.

When using the organic solvent, the amount is in the range of 0.5 to 20 parts by weight, preferably in the range of 1.0 to 10 parts by weight and particularly preferably 2.0 to 5 parts by weight, to 100 parts by weight of the electrode active material. When the amount of the organic solvent is within the range, the durability of the obtained electrochemical element can be excellent.

Also, it is particularly preferable to use both of the above surfactant and organic solvent. By using the surfactant in combination with the organic solvent, the surface tension of the electrode composition slurry can be further lowered, and productivity can be improved. In this case, the total amount of the surfactant and organic solvent is, to 100 parts by weight of the electrode active material, in the range of 0.5 to 20 parts by weight, preferably 1.0 to 10 parts by weight, particularly preferably 2.0 to 5 parts by weight.

(Dispersant)

The electrode composition may include a dispersant for uniformly dispersing the components in addition to the above electrode active material, conducting material and binder.

As a specific example of the dispersant, there may be mentioned cellulose derivative such as carboxymethyl cellulose; poly(meth)acrylate such as sodium poly(meth)acrylate; polyvinyl alcohol, denatured polyvinyl alcohol and polyethylene oxide; polyvinyl pyrrolidone, polycarboxylic acid, oxidized starch, starch phosphate, casein, a variety of modified starch, chitin, chitosan derivative and the like. Among these, cellulose derivative is particularly preferable.

The cellulose derivative is a compound in which at least a part of hydroxyl groups of cellulose is etherified or esterified, and is preferably soluble in water. The cellulose derivative normally has no glass-transition point. Specifically, there may be mentioned carboxymethyl cellulose, carboxymethyl ethyl cellulose, methyl cellulose, ethyl cellulose, ethyl hydroxyethyl cellulose, hydroxyethyl cellulose and hydroxypropyl cellulose, etc. Also, ammonium salt and alkali metal salt thereof may be mentioned. Among these, salt of carboxymethyl cellulose is preferable, and ammonium salt of carboxymethyl cellulose is particularly preferable. The degree of etherification of the cellulose derivative is preferably 0.5 to 2, more preferably 0.5 to 1.5. Note that the degree of etherification is a value showing how many of 3 hydroxyl groups per glucose unit of the cellulose are etherified on average. When the degree of etherification is within the range, the slurry containing the electrode composition can be high in stability, and sedimentation or aggregation of solid content hardly occurs. Furthermore, the use of the cellulose derivative results in improvement in coating property and fluidity of coating material.

<Collector>

The type of materials for the collector includes, for example, metal, carbon, conducting polymer and the like, and metal is preferably used. For example, various materials proposed in applications for battery, capacitor and the like can be used, and it is preferable to use aluminum, stainless and the like for the collector for a positive electrode, and to use stainless, copper, nickel and the like for the collector for a negative electrode, respectively. Also, the collector may not have through pore, but the method of the present invention is particularly suitable for forming the electrode active material layer on a collector having through pores penetrating front and back surfaces (perforated collector). Therefore, as the collector, for example, it is preferable to use expanded metal, punching metal, metal mesh, foam, etching foil having through pore provided by etching, or a collector with projection in which projection and through pore are provided by using embossing roll, etc.

The shape of pore portion of the perforated collector is not particularly limited, and the porosity is preferably in the range of 10% to 90%, further preferably in the range of 20% to 60%, particularly preferably in the range of 40% to 60%. The porosity can be obtained from planar observation of the perforated collector. Specifically, the porosity is determined by planar observation of the perforated collector to calculate the area of through pores per unit area.

By setting the porosity of the collector within the above range, lot-to-lot variation in capacity can be suppressed when producing the electrochemical element. In an electrochemical element using a collector without normal pore portion, when producing a multilayer electrochemical element with a non-facing surface where electrodes are not facing, capacitance can hardly be taken out from the non-facing surface. Furthermore, when the amount of the active material per unit area of the electrode varies, capacitance actually taken out can be reduced compared to the capacitance calculated from the weight of the active material, which may cause deterioration of the electrochemical element. Consequently, lot-to-lot variation in capacity is caused in the electrochemical element, and furthermore, the life of the electrochemical element may be reduced. This is because diffusion of electrolyte ions occurs only at the facing surface of positive and negative electrodes. However, the use of the perforated collector allows electrolyte ions to pass through the collector to diffuse, so that capacitance can be taken out even at the non-facing surface where electrodes are not facing. Furthermore, even when using an electrode having the active materials with different amounts per unit area of thereof, capacities can easily be balanced in a capacitor cell on the condition that the total amount of the electrode active materials is matched between lots, so that lot-to-lot variation in capacity can be suppressed in the electrochemical element. In addition, the life of the electrochemical element can be extended because there is no unbalanced charge in the cell.

Also, when the porosity of the collector is too high for the negative electrode active material to carry lithium, time required for carrying can be shortened and lithium can rarely be carried unevenly, but the strength of the collector can be lowered and easily be got wrinkles or broken. Also, through pore hardly hold the active material and the like, and due to drop-out of the active material and the like, broken electrode, etc., problems such that yield ratio may be declined at the production of the electrode may be caused.

On the other hand, when the porosity is too low, time required for the negative electrode active material to carry lithium can be increased to cause problems such as lowered production efficiency and increased variation in cell properties, but the strength of the collector can be increased and the active material can hardly be dropped out, resulting in increased yield ratio of the electrode. It is desired to properly select the porosity and pore size of the collector within the above ranges in view of battery structure (multilayer type, winding type, etc.) and productivity.

The collector is strip-shaped, and the thickness is, although not particularly limited, preferably 5 to 50 μm, and further preferably 10 to 40 μm. Also, the width is not particularly limited and is preferably about 100 to 1000 mm, further preferably about 200 to 500 mm.

<Forming Method of Electrode Active Material Layer>

In the method for manufacturing of the present invention, the layer of the electrode composition comprising the above-mentioned components is formed on the surface of the base material 1, followed by drying, etc. if necessary, to obtain the electrode active material layer. For the preferable forming method of the electrode active material layer, for example, there may be mentioned a method in which complex particles comprising the electrode composition are provided on the base material and formed into a sheet in dry system (sheet-forming method); a method in which the slurry obtained by dispersing the electrode composition in a solvent (electrode composition slurry) is coated on the base material followed by volatilizing the solvent (coating method); etc., and the coating method is preferable because the electrode active material layer can be uniformly formed on the surface of the base material 1.

The electrode composition slurry can be produced by kneading the electrode active material, conducting material and binder, as well as the dispersant surfactant and organic solvent added if needed, in water or in organic solvent such as N-methyl-2-pyrrolidone and tetrahydrofuran. The electrode composition slurry is preferably aqueous slurry having water as dispersion medium because the electrode active material layer can easily be dried and environmental load can be reduced.

The aqueous slurry can be produced by mixing water and each of the above components by using a mixing machine. As the mixing machine, ball mill, sand mill pigment dispersing machine, stone mill, ultrasonic dispersing machine, homogenizer, planetary mixer, Hobart mixer and the like can be used. Also, for another preferable method, the electrode active material and conducting material are first mixed by using the mixing machine such as stone mill, planetary mixer, Henschel mixer and Omni mixer, and then the binder is added and uniformly mixed. By adopting the latter method, it is possible to easily obtain uniform slurry.

The viscosity of the slurry used in the present invention varies depending on the type of coating machines and coating process, and is normally 100 to 100,000 mPa·s, preferably 1,000 to 50,000 mPa·s, more preferably 5,000 to 20,000 mPa·s.

The coating method of the slurry on the base material is not particularly limited. For example, there may be mentioned doctor blade method, dip method, reverse roll method, direct roll method, gravure method, extrusion method, brush method, etc. The coating thickness of the slurry can properly be determined depending on the thickness of the desired electrode active material layer.

Then, the electrode active material layer comprising the electrode composition formed by coating the above slurry and the collector 2 are stacked, and the electrode active material layer is bonded to the collector 2 by hot press. The laminating and bonding to the collector may be done immediately after coating of the slurry, and the laminating and bonding to the collector is particularly preferably done after drying the electrode composition layer. By drying the electrode composition layer, the thickness of the layer becomes even and the strength is improved, so that the laminating and bonding to the collector become easier. Also, because of laminating and bonding to the collector after drying, the electrode active material layer can be formed on a necessary part of the collector. Furthermore, it is possible to prevent leaving and attaching a part of the electrode active material layer onto the base material at peel-off of the base material after the laminating and bonding to the collector.

For the drying method, for example, there may be mentioned drying by warm air, hot air or low wet air, vacuum drying, drying method with irradiation of (far-)infrared rays, electron beam and the like. Among these, the drying method with irradiation of far-infrared rays is preferable. The drying temperature and drying time in the present invention is preferably those enough to completely remove the solvent in the slurry coated on the collector, and the drying temperature is 100 to 300° C., preferably 120 to 250° C. The drying time is normally 1 minute to 60 minutes, preferably 5 minutes to 30 minutes.

Further specific example for the forming step of the electrode active material layer by coating method is shown in FIG. 1. In FIG. 1, the rolled base material 1 is set in an unwinder 10, the base material 1 is sent forth from the unwinder 10, and the electrode composition slurry is discharged on the surface of the base material 1 from a coater 3, so that the layer of the electrode composition is formed on the surface of the base material 1. Note that the figure does not show the formed layer of the electrode composition. Then, the base material with the layer of the electrode composition formed on the surface thereof is introduced into drying machines 4 to dry the layer of the electrode composition, so that the electrode active material layer is formed. After that, the base material 1 having the electrode active material layer is rolled up by a winder 11 to obtain a rolled product of the base material 1 having the electrode active material layer.

<Bonding of Electrode Active Material Layer to Collector>

Bonding of the electrode active material layer to the collector 2 is performed by hot press. The hot press may be done either before or after the above drying, and as mentioned before, it is preferable to bond the electrode active material layer after drying the slurry to the collector by hot press. The hot press makes it easy to plastically-deform the binder included in the electrode active material layer, improving the adhesion of the collector and the electrode active material layer. Furthermore, the hot press allows obtaining a uniform electrode with smooth surface. Also, with the hot press after drying, the electrode density can easily be increased.

Specifically, the hot press method may include batch-type hot press, continuous hot roll press, etc., and continuous hot roll press, able to increase productivity, is preferable. The temperature of the hot press is not particularly limited as far as the base material is not damaged, and is normally 50 to 200° C., preferably 70 to 150° C. When the temperature of the hot press is within the range, the electrode active material layer can be uniformly bonded to the collector, resulting in excellent electrode strength.

The linear pressure of the hot press is not particularly limited as far as the base material is not damaged, and is normally 50 to 2,000 kN/m, preferably 100 to 1,000 kN/m, particularly preferably 200 to 500 kN/m. When the linear pressure of the hot press is within the range, the electrode active material layer can be uniformly bonded to the collector, resulting in excellent electrode strength.

(Separation of Base Material from Electrode Active Material Layer)

The method for separating the base material from the electrode active material layer is not particularly limited, and for example, the base material can easily be separated by winding the collector, to which the electrode active material layer is bonded, and the base material on separate rolls after bonding of the electrode active material layer. Thus, the collector having the electrode active material layer can be obtained.

A series of steps for the above bonding of the electrode active material layer to the collector and for the separation of the base material is shown in FIG. 2 as the further specific embodiment. Note that the electrode active material layer is not shown in the figure. The electrode active material layer is formed on the surface of the base material 1. In FIG. 2, the above rolled product of the base material 1 having the electrode active material layer is set in unwinders 12, the base material 1 having the electrode active material layer is sent forth. Separately, the rolled collector 2 is set in an unwinder 14 to send forth the collector. Then, the base material 1 having the electrode active material layer and the collector 2 are introduced into a laminating machine 16 having heating mechanism for hot press, so that the base material 1 having the electrode active material layer is bonded to the collector 2. Next, the base material 1 is removed from the electrode active material layer to be rolled up by winders 13, and the collector 2 to which the electrode active material layer is transferred is rolled up by a winder 15 to obtain a rolled product of the collector having the electrode active material layer.

Also, the base material where the electrode active material layer is formed may be bonded, by hot press, to the other surface of the collector opposite to the surface where the electrode active material layer is formed, to produce an electrode for an electrochemical element in which the electrode active material layers are formed on both surfaces of the collector. Furthermore, as shown in FIG. 2, the electrode active material layers may be simultaneously formed on both surfaces of the collector according to the above method.

For the electrode for an electrochemical element obtained by the method for manufacturing of the present invention, the thickness of the electrode active material layer may vary depending on the type of electrochemical elements, and is normally 10 μm to 500 μm, preferably 20 to 400 μm, particularly preferably 30 to 200 μm. When the thickness of the electrode layer is within the range, it is possible to obtain a preferable electrode for an electrochemical element having balanced internal resistance and energy density.

The electrochemical element of the present invention is provided with the electrode for an electrochemical element obtained by the method for manufacturing of the present invention. As the electrochemical element, a lithium-ion secondary battery, electric double layer capacitor, hybrid capacitor and the like may be mentioned, and the hybrid capacitor is preferred. Hereinafter, an example in which the electrode for an electrochemical element obtained by the method for manufacturing of the present invention is used as an electrode for a hybrid capacitor will be explained.

The hybrid capacitor is comprised of a positive electrode, negative electrode, separator and electrolyte, and as the positive electrode or negative electrode, preferably the positive electrode and negative electrode, the electrode for an electrochemical element obtained by the method for manufacturing of the present invention is used.

The separator is not particularly limited as far as it obtains insulation between the electrodes for hybrid capacitor and allows cation and anion to pass through. Specifically, porous membrane or nonwoven fabric made out of polyolefin such as polyethylene and polypropylene, rayon, aramid or glass fiber, porous membrane having pulp, commonly called as electrolytic capacitor paper, as its main material, etc. can be used. The separator is arranged between the electrodes for a hybrid capacitor so as to face a pair of the electrode active material layer, so that an element can be obtained. The thickness of the separator can be properly selected depending on the purpose of use, and is normally 1 to 100 μm, preferably 10 to 80 μm, more preferably 20 to 60 μm.

The electrolyte solution is normally comprised of an electrolyte and solvent. As an electrolyte cation, lithium-ion can be used. As an anion, $PF_6^-$, $BF_4^-$, $AsF_6^-$, $SbF_6^-$, $N(RfSO_3)_2^{2-}$, $C(RfSO_3)_3^{3-}$, $RfSO_3^-$ (where each Rf represents a fluoroalkyl group having carbon number of 1 to 12), $F^-$, $ClO_4^-$, $AlCl_4^-$, $AlF_4^-$ and the like can be used. The electrolyte can be either alone or in combination of two or more.

The solvent of the electrolyte solution is not particularly limited as far as the solvent is commonly used as a solvent for an electrolytic solution. Specifically, there may be mentioned carbonates such as propylene carbonate, ethylene carbonate and butylene carbonate; lactones such as γ-butyrolactone; sulfolanes; nitriles such as acetonitrile; etc. The solvent can be used either alone or as a combined solvent of two or more. Among these, carbonates are preferable.

The above element is impregnated with electrolyte solution, so that the lithium-ion capacitor is obtained. Specifically, the element is winded, layered or bended if needed depending on the battery shape to fit in the battery case, followed by filling the electrolyte solution in the battery case and sealing the case. Also, the element preliminarily impregnated with the electrolyte solution may be installed in the case. For the battery case, any known case can be used, such as coin shape, cylinder shape and square shape case.

EXAMPLES

Hereinafter, the present invention will be further specifically explained by Examples and Comparative Examples, but the present invention is not limited to the examples. Note that part and % in the Examples and Comparative Examples are based on mass unless otherwise designated. Each property in the Examples and Comparative Examples was measured by the following method.

(Peel Strength of Electrode Active Material Layer Formed on Collector)

The electrode was cut into a rectangular test specimen with a length of 100 mm and a width of 10 mm such that the long side corresponds to the coating direction of the electrode composition. The test specimen was then placed to make the surface of the electrode active material layer face down on cellophane tape (as specified in JIS Z1522) for bonding to the surface of the electrode active material layer. One end of the collector was pulled to peel off in vertical direction at pulling speed of 50 mm/min, and the stress was measured. Three measurements were done to obtain the average value, which was determined as peel strength. Higher peel strength indicates higher adhesive strength of the electrode active material layer to the collector, i.e. higher adhesion.

(Contact Angle with Water in the Surface with Release Treatment of Base Material)

2 μl of pure water was dropped in the surface with release treatment of the base material, and static contact angle was measured to calculate the contact angle with water in the surface with release treatment of the base material by θ/2 method.

(The Rate of Transfer of Electrode Active Material Layer)

After hot press of the base material having the electrode active material layer to the collector, the base material was peeled off, and the electrode active material layer was transferred to the collector. The weight of the electrode active material layer remained on the base material after the transfer was measured to calculate the rate of transfer of the electrode active material layer. The lower weight of the electrode active material layer remained on the base material indicates higher rate of transfer.

The rate of transfer of the electrode active material layer (%)={(the weight of the electrode active material layer on the collector (g))−(the weight of the electrode active material layer remained on the base material after the transfer (g)}/(the weight of the electrode active material layer on the base material before the transfer (g))×100

Note that the weight of the electrode active material layer on the base material before the transfer and the weight of the electrode active material layer remained on the base material after the transfer were obtained from the following formula.

The weight of the electrode active material layer on the base material before the transfer=(the weight of the base material after forming the electrode active material layer)−(the weight of the base material before forming the electrode active material layer)

The weight of the electrode active material layer remained on the base material after the transfer=(the weight of the base material after the transfer)−(the weight of the base material before forming the electrode active material layer).

(Porosity Measurement of Collector)

The collector was planarly observed, and the area of the through pores per unit area was calculated, so that the porosity of the collector was calculated.

(Thickness Measurement of Electrode Active Material Layer)

The thickness of the electrode active material layer was measured by using an eddy current displacement sensor (sensor head portion EX-110V and amplifier unit portion EX-V02: by Keyence Corporation) after forming the electrode active material layers on both surfaces of the collector. The thickness of each of the electrode active material layer was measured 2 cm apart in a length direction and 5 cm apart in a width direction, to obtain the thickness of the electrode active material layer as the average value of the measurements.

(High-Speed Coating Property)

The surface of the electrode active material layer formed on the base material was visually observed, those having uniform electrode active material layer was rated as "fine", and those in which the electrode active material layer was formed in a patchy fashion due to repelling of the slurry and the like was rated as "poor".

(Electric Properties of Hybrid Capacitor)

Battery charge was started at constant current of 110 mA, and constant-voltage charge was performed when the charging voltage reached 3.8 V. After the constant-voltage charge for 20 minutes, the battery charge was terminated. Then, discharge was done at constant current of 110 mA up to 2.1V immediately after terminating battery charge. 3 cycles of the charging and discharging operation were performed, and the capacity and internal resistance per volume were obtained from the discharging curve of the third cycle.

Example 1

Production Method of Positive Electrode Slurry

As the electrode active material of the positive electrode, 100 parts of activated carbon powder having a volume average particle size of 8 µm (MSP-20 by KANSAI COKE AND CHEMICALS CO., LTD.) which is alkali-activated carbon having phenolic resin as raw material; as the dispersant, 2 parts of 1.5% aqueous solution of sodium carboxymethyl cellulose (product number 2200 by DAICEL CHEMICAL INDUSTRIES, LTD.) in terms of solid content; as the conducting material, 5 parts of acetylene black (DENKA BLACK powder by DENKI KAGAKU KOGYO K.K.); as the binder, 3 parts of 40% aqueous dispersion of diene polymer having glass-transition temperature of −40° C. and number average particle size of 0.25 µm (copolymer obtained by emulsion polymerization of 60 parts of styrene, 35 parts of butadiene and 5 parts of itaconic acid) in terms of solid content; and ion-exchange water was mixed by a planetary mixer so as to have the total solid content concentration of 35%, so that the positive electrode composition slurry was prepared.

(Production Method of Positive Electrode)

By using polyethylene terephthalate film having a thickness of 38 µm (LINTEC Corporation, the contact angle with water in the surface with release treatment of the base material: 97°) in which the base material was provided with release treatment by alkyd resin, the above-mentioned electrode composition slurry for positive electrode was discharged from die and coated on the film running at a speed of 40 m/min in a horizontal direction, followed by drying at 120° C. for 5 minutes, so that the base material with the positive electrode active material layer having a thickness of 130 µm was obtained and rolled up.

Next, thus-formed positive electrode active material layer and aluminum expanded metal having a thickness of 30 µm and porosity of 50 area % as the perforated collector were layered, let into a continuous roll press at a temperature of 100° C. and bonded together. Then, the base material was separated from the electrode active material layer by roll.

Finally, the above base material with the positive electrode active material layer was let into a continuous roll press to bond to the other surface of the above perforated collector. Then, the base material was separated from the electrode active material layer by roll to obtain the collector having the electrode active material layer with a thickness per surface of 100 µm on both sides (positive electrode for an electrochemical element). The peel strength of the electrode was 17.1 N/m, and the rate of transfer of the electrode active material layer to the collector was 91.2%.

(Production Method of Negative Electrode Slurry)

As the electrode active material of the negative electrode, 100 parts of black lead having a volume average particle size of 2.7 µm (KS-4 by TIMCAL Graphite & Carbon); as the dispersant, 2 parts of 1.5% aqueous solution of sodium carboxymethyl cellulose (product number 2200 by DAICEL CHEMICAL INDUSTRIES, LTD.) in terms of solid content; as the conducting material, 5 parts of acetylene black (DENKA BLACK powder by DENKI KAGAKU KOGYO K.K.); as the binder, 3 parts of 40% aqueous dispersion of diene polymer having glass-transition temperature of −40° C. and number average particle size of 0.25 µm (copolymer obtained by emulsion polymerization of 60 parts of styrene, 35 parts of butadiene and 5 parts of itaconic acid) in terms of solid content; and ion-exchange water was mixed by a planetary mixer so as to have the total solid content concentration of 35%, so that the negative electrode composition slurry was prepared.

(Production Method of Negative Electrode)

By using polyethylene terephthalate film having a thickness of 38 µm (LINTEC Corporation, the contact angle with water in the surface with release treatment of the base material: 97°) in which the base material was provided with release treatment by alkyd resin, the above-mentioned negative electrode composition slurry was discharged from die and coated on the film running at a speed of 40 m/min in a horizontal direction, followed by drying at 120° C. for 5 minutes, so that the base material with the negative electrode active material layer having a thickness of 60 µm was obtained and rolled up.

Next, thus-formed negative electrode active material layer and copper expanded metal having a thickness of 20 µm and porosity of 50 area % as the perforated collector were layered, let into a continuous roll press at a temperature of 100° C. and bonded together. Then, the base material was separated from the electrode active material layer by roll.

Finally, the above base material with the negative electrode active material layer was let into a continuous roll press to bond to the other surface of the above perforated collector. Then, the base material was separated from the electrode active material layer by roll to obtain the collector having the electrode active material layer with a thickness per surface of 30 µm on both sides (negative electrode for an electrochemical element). The peel strength of the electrode was 5.5 N/m, and the rate of transfer of the electrode active material layer to the collector was 94%.

(Preparation of Cell for Measurement)

The above-prepared two-sided electrodes (positive electrode and negative electrode) were cut out so as to leave uncoated part with a length of 2 cm and a width of 2 cm in which the electrode active material layer was not formed, and to have the part with a length of 5 cm and a width of 5 cm in which the electrode active material layer was formed (where the uncoated part was formed so as to extend one side of a 5 cm×5 cm square in which the electrode active material layer was formed). 10 pieces of thus-cut positive electrode and 11 pieces of thus-cut negative electrode were prepared, and respective uncoated parts were subjected to ultrasonic weld. Furthermore, tab materials with 7 cm long×1 cm wide×0.01 cm thick, respectively made of aluminum for the positive electrode and nickel for the negative electrode, were ultrasonically welded to the uncoated parts respectively layered and welded, so that the electrode for measurement was prepared. The electrode for measurement was dried with vacuum at 200° C. for 24 hours. By using cellulose/rayon-mixed nonwoven fabric having a thickness of 35 µm as the separator, welded end portions of the positive electrode collector and negative electrode collector were mutually oppositely arranged, and these were stacked in layers so as to alternate the positive electrode and the negative electrode and to have negative electrodes at both outermost parts of the stacked electrodes. At the top part and the bottom part, the separators were arranged, and 4 sides were secured with tape.

As a lithium pole, lithium metal foil (thickness of 51 μm, 5 cm long×5 cm wide) pressed and bonded to stainless steel having a thickness of 80 μm was used, and each of the lithium poles was arranged at the top part and the bottom part of the stacked electrode to fully face the outermost negative electrode. Note that (2) welded end portions of the lithium pole collector were subjected to resistance weld to the welded end portions of the negative electrode.

The above layered product in which the lithium foils were arranged at the top part and the bottom part was installed in deep drawing exterior film, and covered by exterior laminated film, followed by fusion bonding of three sides. After vacuum impregnation with the electrolyte, i.e. a solution obtained by dissolving $LiPF_6$ in a concentration of 1 mol/L in a mixed solvent in which ethylene carbonate, diethyl carbonate and propylene carbonate were included in weight ratio of 3:4:1, the remaining one side was subjected to fusion bonding, so that a film-type hybrid capacitor was prepared.

(Assessment of Cell Properties)

When the cell was broken down after leaving it for 16 days at room temperature, it was found that the lithium metal was completely lost. Therefore, it was understood that the lithium moved between both sides of the positive electrode and negative electrode, and that all negative electrodes were preliminarily charged.

Measurement results of the peel strength of the obtained electrode active material layer, the contact angle with water in the surface of the base material, the rate of transfer of the electrode active material layer, the thickness of the electrode active material layer, high-speed coating property, and capacity and internal resistance of the hybrid capacitor are shown in Table 1.

Example 2

Except for using 40% aqueous dispersion of acrylate polymer having glass-transition temperature of −40° C. and number average particle size of 0.25 μm (copolymer obtained by emulsion polymerization of 96 parts of 2-ethylhexyl acrylate and 4 parts of methacrylic acid) as the binder of the positive electrode composition slurry and negative electrode composition slurry, the positive electrode for an electrochemical element, negative electrode for an electrochemical element and hybrid capacitor were produced as in Example 1. For each property of the electrodes for an electrochemical element and hybrid capacitor, measurement results are shown in Table 1.

Example 3

Except for using polyethylene terephthalate film having a thickness of 38 μm (LINTEC Corporation, the contact angle with water in the surface with release treatment of the base material: 82°) in which the base material was provided with release treatment by alkyd resin, the positive electrode for an electrochemical element, negative electrode for an electrochemical element and hybrid capacitor were produced as in Example 1. For each property of the electrodes for an electrochemical element and hybrid capacitor, measurement results are shown in Table 1.

Example 4

Except for using polyethylene terephthalate film having a thickness of 38 μm (LINTEC Corporation, the contact angle with water in the surface with release treatment of the base material: 108°) in which the base material was provided with release treatment by alkyd resin, the positive electrode for an electrochemical element, negative electrode for an electrochemical element and hybrid capacitor were produced as in Example 1. For each property of the electrodes for an electrochemical element and hybrid capacitor, measurement results are shown in Table 1.

Example 5

Except for changing the temperature of the continuous roll press for bonding the electrode active material layer formed on the base material to the perforated collector to 50° C., the positive electrode for an electrochemical element, negative electrode for an electrochemical element and hybrid capacitor were produced as in Example 1. For each property of the electrodes for an electrochemical element and hybrid capacitor, measurement results are shown in Table 1.

Example 6

Except for changing the temperature of the continuous roll press for bonding the electrode active material layer formed on the base material to the perforated collector to 150° C., the positive electrode for an electrochemical element, negative electrode for an electrochemical element and hybrid capacitor were produced as in Example 1. For each property of the electrodes for an electrochemical element and hybrid capacitor, measurement results are shown in Table 1.

Example 7

Except for adding 4 parts of a nonionic surfactant, i.e. polyoxyethylene distyrenated phenyl ether (EMULGEN A-60 by Kao Corporation), as the surfactant to the positive electrode composition slurry and negative electrode composition slurry, the positive electrode for an electrochemical element, negative electrode for an electrochemical element and hybrid capacitor were produced as in Example 2. For each property of the electrodes for an electrochemical element and hybrid capacitor, measurement results are shown in Table 1.

Example 8

Except for adding 4 parts of an anionic surfactant, i.e. sodium naphthalene sulfonate formaldehyde condensates (DEMOL N by Kao Corporation), as the surfactant to the positive electrode composition slurry and negative electrode composition slurry, the positive electrode for an electrochemical element, negative electrode for an electrochemical element and hybrid capacitor were produced as in Example 2. For each property of the electrodes for an electrochemical element and hybrid capacitor, measurement results are shown in Table 1.

Example 9

Except for adding 4 parts of ethyl acetate, belonging to alkyl esters, as the organic solvent to the positive electrode composition slurry and negative electrode composition slurry, the positive electrode for an electrochemical element, negative electrode for an electrochemical element and hybrid capacitor were produced as in Example 2. For each property of the electrodes for an electrochemical element and hybrid capacitor, measurement results are shown in Table 1.

Example 10

Except for adding 4 parts of isopropanol, belonging to alcohols, as the organic solvent to the positive electrode composition slurry and negative electrode composition slurry, the positive electrode for an electrochemical element, negative electrode for an electrochemical element and hybrid capacitor were produced as in Example 2. For each property of the electrodes for an electrochemical element and hybrid capacitor, measurement results are shown in Table 1.

Example 11

Except for adding 4 parts of an anionic surfactant, i.e. sodium naphthalene sulfonate formaldehyde condensates (DEMOL N by Kao Corporation), as the surfactant and 4 parts of isopropanol, belonging to alcohols, as the organic solvent to the positive electrode composition slurry and negative electrode composition slurry, the positive electrode for an electrochemical element, negative electrode for an electrochemical element and hybrid capacitor were produced as in Example 2. For each property of the electrodes for an electrochemical element and hybrid capacitor, measurement results are shown in Table 1.

Comparative Example 1

Except for changing the temperature of the continuous roll press for bonding the electrode active material layer to the perforated collector to 25° C., the positive electrode for an electrochemical element, negative electrode for an electrochemical element and hybrid capacitor were produced as in Example 1. For each property of the electrode for an electrochemical element and hybrid capacitor, measurement results are shown in Table 1.

TABLE 1

| | | Example 1 | Example 2 | Example 3 | Example 4 | Example 5 | Example 6 | Example 7 |
|---|---|---|---|---|---|---|---|---|
| Binder Type | Diene Polymer | Included | — | Included | Included | Included | Included | — |
| | Acrylate Polymer | — | Included | — | — | — | — | Included |
| Contact Angle with Water in Surface of Base Material (°) | | 97 | 97 | 82 | 108 | 97 | 97 | 97 |
| Temperature of Continuous Roll Press | | 100 | 100 | 100 | 100 | 50 | 150 | 100 |
| Surfactant Type | Nonionic Surfactant | — | — | — | — | — | — | Included |
| | Anionic Surfactant | — | — | — | — | — | — | — |
| Organic Solvent Type | Ethyl Acetate | — | — | — | — | — | — | — |
| | Isopropanol | — | — | — | — | — | — | — |
| Amount Added of Surfactant and/or Organic Solvent (per 100 parts by weight of electrode active material) | | — | — | — | — | — | — | 4 |
| Bonding Method of Electrode Active Material Layer to Collector | | \multicolumn{7}{Bonding after Coating & Drying} |
| <Positive Electrode> | | | | | | | | |
| Peel Strength of Electrode Active Material | | 17.1 | 18.3 | 16.4 | 16.0 | 14.0 | 19.1 | 20.4 |
| Rate of Transfer of Electrode Active Material Layer (%) | | 91.2 | 92.0 | 85.6 | 90.0 | 81.0 | 96.0 | 98.5 |
| Coating at Speed of 40 m/min | | Fine | Fine | Fine | Fine | Fine | Fine | Fine |
| Thickness of Electrode Active Material Layer (μm) | | 100 | 100 | 100 | 100 | 100 | 100 | 100 |
| <Negative Electrode> | | | | | | | | |
| Peel Strength of Electrode Active Material | | 5.5 | 6.3 | 4.5 | 4.9 | 3.8 | 5.8 | 7.7 |
| Rate of Transfer of Electrode Active Material Layer (%) | | 94.0 | 94.5 | 86.0 | 91.0 | 92.5 | 97.8 | 98.8 |
| Coating at Speed of 40 m/min | | Fine | Fine | Fine | Fine | Fine | Fine | Fine |
| Thickness of Electrode Active Material Layer (μm) | | 30 | 30 | 30 | 30 | 30 | 30 | 30 |
| Electric Properties of Hybrid Capacitor | | | | | | | | |
| Cell Capacity (mAh/cc) | | 16.0 | 16.5 | 16.1 | 16.2 | 15.8 | 16.0 | 17.1 |
| Internal Resistance (Ω) | | 0.13 | 0.10 | 0.15 | 0.13 | 0.18 | 0.15 | 0.10 |

| | | Example 8 | Example 9 | Example 10 | Example 11 | Comp. Example 1 |
|---|---|---|---|---|---|---|
| Binder Type | Diene Polymer | — | — | — | — | Included |
| | Acrylate Polymer | Included | Included | Included | Included | — |
| Contact Angle with Water in Surface of Base Material (°) | | 97 | 97 | 97 | 97 | 97 |
| Temperature of Continuous Roll Press | | 100 | 100 | 100 | 100 | 25 |
| Surfactant Type | Nonionic Surfactant | — | — | — | — | — |
| | Anionic Surfactant | Included | — | — | Included | — |
| Organic Solvent Type | Ethyl Acetate | — | Included | — | — | — |
| | Isopropanol | — | — | Included | Included | — |
| Amount Added of Surfactant and/or Organic Solvent (per 100 parts by weight of electrode active material) | | 4 | 4 | 4 | 8 | — |
| Bonding Method of Electrode Active Material Layer to Collector | | | Bonding after Coating & Drying | | | Bonding after Coating & Drying |
| <Positive Electrode> | | | | | | |
| Peel Strength of Electrode Active Material | | 21.0 | 18.0 | 18.5 | 18.5 | 10.3 |
| Rate of Transfer of Electrode Active Material Layer (%) | | 98.8 | 94.0 | 93.5 | 100 | 23 |
| Coating at Speed of 40 m/min | | Fine | Fine | Fine | Fine | Fine |

TABLE 1-continued

|  | | | | | |
|---|---|---|---|---|---|
| Thickness of Electrode Active Material Layer (μm) | 100 | 100 | 100 | 100 | 100 |
| <Negative Electrode> | | | | | |
| Peel Strength of Electrode Active Material | 7.9 | 6.8 | 6.9 | 6.5 | 2.5 |
| Rate of Transfer of Electrode Active Material Layer (%) | 99.0 | 96.0 | 96.1 | 100 | 25 |
| Coating at Speed of 40 m/min | Fine | Fine | Fine | Fine | Fine |
| Thickness of Electrode Active Material Layer (μm) | 30 | 30 | 30 | 30 | 30 |
| Electric Properties of Hybrid Capacitor | | | | | |
| Cell Capacity (mAh/cc) | 17.3 | 16.8 | 16.9 | 17.2 | 12.2 |
| Internal Resistance (Ω) | 0.09 | 0.08 | 0.07 | 0.06 | 0.33 |

The results in Table 1 show the following:

According to the present invention, it is possible to easily, uniformly and highly-adhesively form the electrode active material layer on the perforated collector having through pores penetrating front and back surfaces as shown in Examples 1 to 11. Also, the electrochemical element having thus-obtained electrodes shows low internal resistance and good electric properties.

On the other hand, in Comparative Example 1, the electrode active material layer formed on the base material and the perforated collector were bonded together at room temperature, so that the electrode active material layer was not uniformly transferred from the base material to the perforated collector, and the adhesion between the collector and the electrode active material layer was poor. Also, the electrochemical element having thus-obtained electrodes shows high internal resistance and deteriorated electric properties.

EXPLANATION OF SYMBOLS

1 base material
2 collector
3 coater
4 drying machine
10,12,14 unwinder
11,13,15 winder
16 aminating machine

The invention claimed is:

1. A method for manufacturing an electrode for an electrochemical element, comprising:
   (1) forming an electrode active material layer on a surface of a base material, which is preliminarily subjected to release treatment and of which a contact angle with water in the surface with release treatment is 80 to 110°, by using an electrode composition including an electrode active material, conducting material and binder;
   (2) laminating said electrode active material layer, formed on the surface of the base material, and a collector, followed by bonding the same by hot press; and
   (3) separating the base material from the electrode active material layer.

2. The method for manufacturing as set forth in claim 1, wherein said release treatment is done by treating one surface or both surfaces of a thermoplastic resin film with thermosetting resin.

3. The method for manufacturing as set forth in claim 1, wherein said step (1) comprises coating aqueous slurry including said electrode composition and water on the surface of the base material with release treatment.

4. The method for manufacturing as set forth in claim 1, wherein said step (1) comprises drying after coating slurry of electrode composition including electrode active material, conducting material and binder on said surface of the base material.

5. The method for manufacturing as set forth in claim 1, wherein said collector is a perforated collector.

6. The method for manufacturing as set forth in claim 1, wherein said binder includes an acrylate-based polymer.

7. The method for manufacturing as set forth in claim 1, wherein said electrode composition further includes a surfactant.

8. The method for manufacturing as set forth in claim 1, wherein said electrode composition further includes organic solvent having boiling point of 50 to 150° C.

9. The method for manufacturing as set forth in claim 7, wherein said surfactant is an anionic surfactant.

10. The method for manufacturing as set forth in claim 8, wherein said organic solvent is alcohols.

* * * * *